Aug. 9, 1938.　　　H. CATRON ET AL　　　2,125,990
LIGHTING MEANS FOR VEHICLES
Filed June 12, 1936　　　3 Sheets-Sheet 1

Inventors.
Harold Catron
Harold H. Clayton
Ralph L. Dashner
By
Brown, Jackson, Boettcher & Dienner
Attys.

Aug. 9, 1938.   H. CATRON ET AL   2,125,990
LIGHTING MEANS FOR VEHICLES
Filed June 12, 1936   3 Sheets-Sheet 2

Inventors:
Harold Catron
Harold H. Clayton
Ralph L. Dashner

By
Brown, Jackson, Boettcher & Dienner
Attys.

Aug. 9, 1938.                H. CATRON ET AL                    2,125,990
                         LIGHTING MEANS FOR VEHICLES
                          Filed June 12, 1936         3 Sheets-Sheet 3

Inventors:
Harold Catron
Harold H. Clayton
Ralph L. Dashner
By Brown, Jackson, Boettcher & Dienner
                              Attys.

Patented Aug. 9, 1938

2,125,990

UNITED STATES PATENT OFFICE 2,125,990

LIGHTING MEANS FOR VEHICLES

Harold Catron, Harold H. Clayton, and Ralph L. Dashner, Logansport, Ind., assignors to R-B-M Manufacturing Company, Logansport, Ind., a corporation of Indiana Application June 12, 1936, Serial No. 84,832

17 Claims. (Cl. 171—97)

This invention relates to lighting means for vehicles, and more particularly is directed to control means responsive to faults in the lighting circuit for giving an indication of such conditions and also providing for auxiliary lighting of the vehicle.

The increase in the number of automobile accidents, the majority of which occur under night driving conditions, has placed special emphasis on the necessity of having the lighting circuits of the vehicle in proper operating condition. However, this does not, in itself, afford any protection for the operator who finds his system faulty in some manner when driving under such conditions.

It is the primary object of the present invention to provide, automatically, auxiliary driving lights for the vehicle in the event that the regular headlamps fail to function, due to burned-out filaments, open connections, or grounded wires in the headlamp circuit. The present invention proposes to achieve this result by an automatic instantaneous change which occurs during driving conditions when the lighting switch is in one of its driving positions.

The present invention is of particular advantage in that it replaces all overload protective devices such as fuses and circuit breakers used in the lighting circuit, and provides in their stead a positive lock-out unit which prevents a high current flow to the overloaded or shorted circuit and at the same time energizes auxiliary lamps for illumination. The lock-out remains in operation until the lighting circuit control switch is returned to its open position.

Another advantage of the present invention resides in the fact that our improved apparatus operates automatically to energize the auxiliary lamps in the event of an open circuit condition in the main lighting circuit or circuits.

Another advantage of the present invention resides in the fact that the control unit for the system can be installed in any position and in any location on the car, it being necessary only to protect it against excessive temperatures or mechanical injuries. Vibration of the car does not affect the operating characteristics of the unit, and these characteristics are capable of any predetermined variation in accordance with individual specifications.

The invention is capable of use for protection of the driving light circuits, and can be adapted either for energization of independent auxiliary lights or of the parking lights upon occurrence of a fault condition. Protection is also afforded against shorts in the parking or auxiliary lamp circuits. The units are designed to have substantially no internal resistance losses which would affect operation of the car lights, and consume only a very low current during operation.

In the preferred embodiment of the invention, the unit comprises two relays which are mechanically and electrically interconnected. One relay functions as an open circuit device and the other as a short circuit or overload lock-out device. The interconnection of the relays assures the excitation of the auxiliary or safety lamps upon a predetermined operation of either relay.

The present invention contemplates broadly the provision of means responsive to a fault condition in the driving light circuits, such as overload, short-circuit, or open circuit conditions, for energizing auxiliary safety driving lights independently of any control required of the operator of the vehicle. The changeover under a fault condition is instantaneous and occurs only under driving conditions when the lighting switch is in energized position.

Other objects and advantages of the present invention will appear more fully from the following detailed description which, taken in conjunction with the accompanying drawings, will disclose to those skilled in the art the particular construction and operation of preferred forms of the present invention.

Figure 1:
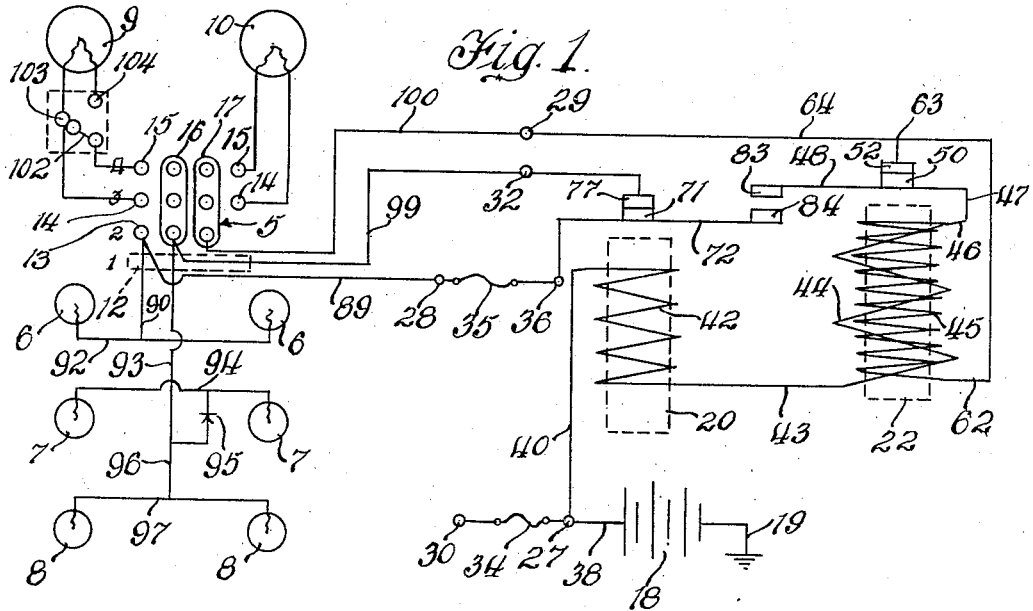
Figure 1 is a circuit diagram showing one embodiment of the invention.

Referring now in detail to Figure 1 of the drawings, a conventional type of lighting circuit is provided comprising the lighting control switch 5, the parking lights 6, the instrument lights 7, the tail lights 8, and the headlights 9 and 10.

The switch 5 comprises a switch bar indicated diagrammatically at 12, which is moved into bridging engagement across contacts 13, 14 and 15 for respectively energizing the parking lights circuit, the dim driving lights circuit and the bright driving lights circuit. Current conductor bars 16 and 17 are provided between the respective pairs of contacts, and serve to complete circuits through the respective contacts with which the switch bar 12 may be in engagement.

As shown in Figure 1, the numerals 1, 2, 3, and 4 associated with the lighting switch indicate, respectively, the positions of the switch when in "off" position, "parking" position, "dim" position, and "bright" position.

It is understood that the circuit disclosed is of the type in which the filaments of the respective lights 6, 7, 8, 9 and 10 are all grounded, to complete a grounded circuit to the battery 18, which is also grounded as indicated at 19.

Considering now in detail the control unit, this unit comprises the open circuit relay 20 and the lock-out relay 22, which are mounted on a common insulating terminal plate 23 carried at the open side of a control housing 24. The housing 24 is provided with a supporting strap 25 rigidly secured thereto as by means of rivets or the like, and having extending ears 26 for attachment to any suitable supporting surface. The supporting plate 23 is adapted to carry a plurality of terminal lugs 27, 28, 29, 30 and 32. These lugs are suitably secured to the plate by means of rivets or the like, and suitable fuse clips are carried on the terminals 27, 28 and 30, these clips being indicated at 33, for supporting fuse 34 between the terminals 27 and 30, and the fuse 35 extending between the terminal 28 and a terminal lug 36 carried by the coil 20, and which is riveted to the outer face of the terminal plate 23 to provide permanent electrical connection with the armature of this coil. The other relay is supported by the riveted engagement on the opposite side of the terminal plate 23, as indicated at 37.

Figure 4:
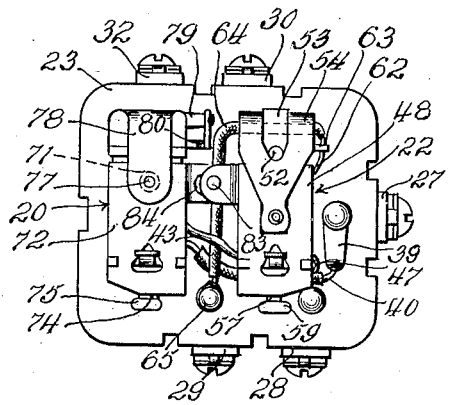
Figure 4 is a bottom plan view of the unit, with the casing removed.

A suitable conductor 38 extends from the battery 18 to the terminal 27, and from this terminal 27 a conductor lug 39, shown in Figure 4, provides for connection of the conductor 40 thereto which leads to the coil supported on the lug 36. This coil is indicated generally at 42 in Figure 1, and from the opposite end of coil 42 a conductor 43 extends the circuit to a coil 44 disposed about the relay 22. The relay 22 is provided with the primary winding 44 and also with a relatively high resistance shunt winding 45 having a comparatively large number of turns, the series winding 44 and the shunt winding 45 having common connection each at one end as indicated at 46 in Figure 1 to a conductor 47 leading to the armature 48 for the coil 22. The armature 48 has hinged support on the vertically extending support 49 which forms a part of the core frame, and is provided with a contact 50 at the free end thereof adapted to have engagement with a contact 52 carried by a leaf spring 53 secured to the free end of a contact supporting arm 54, which is separated from the armature frame by insulation 55. A suitable stop member for limiting attracted movement of the armature is indicated at 56, and extends upwardly into a position substantially coplanar with the top of the relay 22. A suitable coiled spring 57 is carried between a suitable projection 58 formed on the supporting frame 49 and a rearwardly extending projection 59 carried by the end of the armature 48 which extends beyond the pivotal connection indicated at 60, and normally urges the armature out of attracted position to effect engagement between contacts 50 and 52.

The opposite end of the shunt coil 45 is connected through the conductor 62 to an integral projection 63 on the contact supporting arm 54, and from this projection an insulated conductor 64 is extended to the terminal stud 65 which forms a riveted support for the terminal lug 29, thereby extending the circuit from the shunt coil and from the contact 52 to the terminal lug 29. A good electrical bond between the armature 48 and the supporting frame 49 is provided by means of the bare conductor 66, which has soldered connection at opposite ends to these two portions of the unit.

Considering now the relay 20, this relay is provided with a similar core frame 70, and has the armature 72 pivotally mounted at the end of one leg thereof, this armature having a rearwardly extending projection 73 receiving one end of the spring 74 which, at its opposite end, is engaged over the integral projection 75 formed in the supporting frame. The armature is bonded to the supporting frame 70 by means of the conductor 76 having soldered connection therebetween.

The armature is provided with a contact 71 having engagement with the fixed contact 77 carried by the contact frame 78, and from the contact frame 78 electrical connection is made through a soldered connection to a lug 79 carried by the terminal stud which supports terminal lug 32. This soldered connection is indicated at 80 in Figure 4.

The armature 48 of the relay 22 has a laterally offset portion 82 carrying the contact 83, which is adapted to have engagement with the contact 84 carried by the projection 85 on the armature 72 of the relay 20. When the parts have been connected and the terminal connections to the armatures and to the relays have been made, the terminal plate 23 is secured in position with the relays 20 and 22 extending into the interior of the housing 24, and suitably projecting ears 87 at the upper defining edge of the housing 24 are bent over suitably notched portions of the terminal plate 23 to secure the same in fixed position. Preferably, a suitable gasket 88 is provided in order to seal the interior of the housing.

It will be noted that the armature frame 70 and the armature 72 of the relay 20 are connected to the terminal lug 36 which supports this relay in position on the plate 23, and the lug 36 is connected through the fuse 35 to the terminal 28. The terminal 30 of the unit is connected through the fuse 34 to the battery terminal 27, and from the terminal 30 any suitable connections can be made to auxiliary appliances to be served by the battery, so that these appliances will not in any manner be hooked into the lamp operating circuit. As this unit is used primarily for the purpose of protecting the operator against headlight failure, it is more or less imperative that no accessary of any kind be connected to the driving light circuit. For this reason the extra terminal 30 has been provided on the unit in order to give current supply to any accessories desired, through the fuse connection 34 to the battery terminal 27.

From the terminal 28 of the unit, a conductor 89 extends the circuit leading to this terminal to the contact 13 of the light control switch 5, and from the contact 13 a second conductor 90 leads to a common branched conductor 92 leading to the filaments of the parking lights 6. The terminal bridge plate 16 of the light switch 5 is connected through the conductor 93 to the branched conductor 94 leading to the instrument lights 7, there being a suitable switch or other means 95 for controlling the excitation of these lights, and is also extended through the conductor 96 to the branch conductor 97 leading to the tail lights 8. The terminal bridging member 16 is provided with current by means of the conductor bar 12 when the latter is in positions 2, 3 or 4.

The terminal 29 of the control unit extends the circuit from the contact 52 and from the end of the shunt coil 45 through the conductor 100 to the terminal bridging plate 17 in the light control switch 5.

Considering now the operation of the circuit shown in Figure 1, and bearing in mind that the relay 22 is a short circuit or overload lockout relay, while the relay 20 is an open circuit relay, a battery connection from the battery 18 is provided through the terminal 27 to the winding 42 of the relay 20, and thence across to the primary winding 44 of the relay 22, and from the junction point 46 to the shunt winding 45 of this relay, which at its outer end is connected through the conductor 62 to the junction 63.

Assume now that the switch blade 12 is moved from the "off" position in which it is shown, to the position indicated by the numeral 2, that is, to a position bridging across the terminal bridging members 16 and 17 and the contact 13. The circuit then extends from the battery 18 through the conductors 38 and 40 and winding 42 of the open circuit relay 20, through conductor 43 to the winding 44 of the short circuit relay 22. If an overload or short circuit condition exists or develops in the circuits of the parking lights, instrument lights, or tail lights, the armatures 48 and 72 will vibrate violently until fuse 35 blows. This is due to the armature 48 moving down, opening contacts 50 and 52 under the influence of the series coil 44 and the shunt coil 45, and closing contacts 83 and 84. The short or overload existing in the circuit connected to armature 72 immediately causes the coil 45 to become partially de-energized, thus returning armature 48 to its normal position, whereupon the cycle is repeated until fuse 35 opens.

Assume now that the blade bar 12 is moved into position indicated by the numeral 3, bridging across the contacts 14 and the terminal bridging members 16 and 17. In this position, a circuit is extended from the battery to the contacts 14, which extend to the dim filaments of the headlights 9 and 10. When the switch is moved to such position, the current through the coil 42 of the relay 20 is sufficient to attract the armature 72 to a position opening the contacts 71 and 71, thereby extinguishing current flow through the fuse 35, terminal 28, and conductor 89, to the contact 13 and also through conductor 90 to the parking lights 6. However, if the headlamps are burned out, or there is an open circuit in the headlight circuit controlled by the switch 12 when in position No. 3, this open circuit condition will result in reduced current flow through the coil 42, due to the fact that the only current now flowing through the conductor 100 to the terminal bridging member 17 is that required by the instrument and tail lamps, and this is insufficient to retain armature 72, on relay 20, in down position. The armature will move up into position to close contacts 71 and 77. This results in producing a current flow from conductor 100 to the terminal bridging member 17, and from this bridging member back through the bridging member 16 and conductor 99 to terminal 32, and thence through contacts 71 and 77 and terminal 28 to the conductor 89, which is directly connected through conductors 90 and 92 to the parking lights 6, thereby energizing the parking lights so that even under open circuit conditions in the headlight circuit controlled by the contact 14, the parking lights will automatically be energized under such conditions, to give safety auxiliary lighting for the operator of the vehicle.

It will be apparent that if the circuit through the contacts 14 to the dim filaments of the headlamps 9 and 10 is in proper working condition, current flow is established from the conductor 100 and the terminal bridging member 17 to the bridging member 16 and to the contacts 14 through the contact switch bar 12, thence through the filaments of the headlights 9 and 10 to ground, and this current flow will be sufficient to energize the relay 20 for opening the circuit between contacts 71 and 77, which merely results in deenergization of the circuit controlled by fuse 35 through conductor 89 to the parking lamps. The operator of the vehicle may therefore drive along with the dim filaments of the headlights energized, as long as the headlight circuit is in its proper operating condition. If the headlight filaments burn out, or an open circuit occurs, the current flow through the circuit is decreased, and consequently the armature 72 moves back into engagement with contacts 71 and 77 under the influence of spring 74, whereby the parking light circuit is energized as previously described, to energize the parking lights 6 for auxiliary safety driving lights.

With the switch contactor 12 remaining in the position indicated by the number 3, and a short circuit or overload current occurring in the headlight circuit, the excessive current produced thereby will cause the armature 48 of the relay 22 to be actuated to open the contacts 50 and 52, thereby placing the relatively high resistance shunt coil 45 in series with the shorted or overloaded headlight circuit, causing the heavy current flow therein to be reduced to a low value and energizing said shunt coil 45. The energization of this coil continues the movement of the armature 48 into position to produce contacting engagement between the contacts 83 and 84. Inasmuch as under such conditions the contacts 71 and 77 will close as soon as the contacts 52 and 50 open, a momentary short will exist before the contacts 71 and 77 again open. The instantaneous current, however, accelerates the action of the armature 48, due to the lock-out relay current coil 44 being in series with the armature 48, and the armature 48 will be locked down to effect contact between the contacts 83 and 84. This establishes a circuit through the armature 72 and fuse 35 to the terminal 28, and thence through the conductor 89 and conductor 90 to the parking lights. As a result, these lights are energized for auxiliary safety driving purposes the instant that a short circuit or excessive current flow is produced in the headlamp circuit with the switch blade bar 12 in the position indicated by the number 3.

Assume now that the blade bar 12 is moved into a position to bridge across the contacts 15 and terminal bridging members 16 and 17 in the position indicated by the numeral 4, in which case the bright filament of the lamp 10 is constantly energized, while the bright and dim filaments of the lamp 9 are energized, depending upon the position of the dimmer control switch 102. This switch may take the form of a foot operated dimmer control switch such as described in the prior patent of Marion W. Morris, No. 2,085,539, issued June 29, 1937, or may be of any other desired form, being operated in such manner as to connect the contact 15 associated with the headlamp 9 alternately to either the contact 103 or the contact 104, thereby controlling passage of current to the dim and bright filaments of the lamp 9, respectively.

With the switch bar 12 in this position, the control unit will function in the same manner as previously described when an open circuit or a condition corresponding to an open circuit condition occurs, such as the burning out of the headlamp filament. Under such circumstances, the current flow through the coil 42 is insufficient to maintain the relay 72 energized, and consequently current flow is provided through conductor 100, bridging members 16 and 17, conductor 99, and contacts 71 and 77, to conductor 89, and thence through the auxiliary lamps 6, which are thus instantaneously energized upon an open circuit condition arising in the headlamp circuit. Under normal conditions, the current flow through the coil 42 is such as to maintain the armature 72 in attracted position, holding contacts 71 and 77 apart. Similarly, when a short circuit or excessive current flow is produced in the headlamp circuit, with the switch bar in this last described position, the heavy current through the coil 44 results in attraction of the armature 48 into a position opening contacts 50 and 52, thereby placing the relatively high resistance shunt coil 45 in series with the shorted or overloaded headlight circuit, causing the heavy current flow therein to be reduced to a low value and energizing said shunt coil 45, as previously described. The energization of this coil continues the movement of the armature 48 into position to engage contacts 83 and 84, thereby establishing a circuit through armature 72 and terminal 28 to the conductor 89 for energizing the lamps 6 in the manner previously described. During the existence of a short circuit or excessive current condition, the armature 48, due to the energization of the lock-out relay current coil 44 of the relay 22, is locked down in position to maintain engagement between contacts 83 and 84, thereby insuring that the lamps 6 will remain energized during the duration of such a short circuit or excessive current condition. Similarly, during an open circuit or burned out filament condition of the headlamps circuit, the armature 72 will be moved by the spring 74 into position to close contacts 71 and 72, and will remain in that position during the duration of the fault. However, when it is desired to restore the device to normal condition, switch blade bar 12 is moved into the position shown by the numeral 1, in which position both of the armatures 48 and 72 are released to move into the positions as shown in Figure 1.

Figure 6:
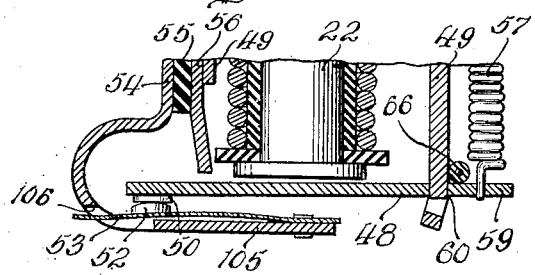
Figures 6 and 7 are enlarged detail views showing the armature contact employed in the unit shown in Figures 3 to 5, inclusive.
Figure 5:
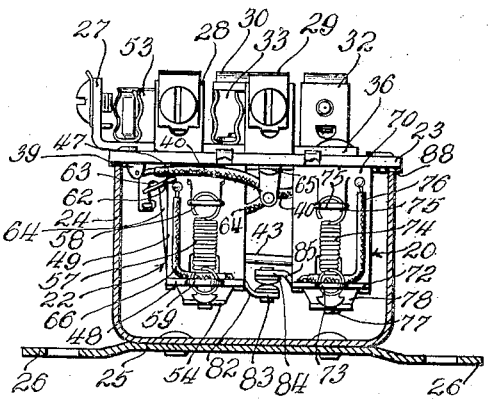
Figure 5 is an end elevational view of the unit shown in Figures 3 and 4.
Figure 7:
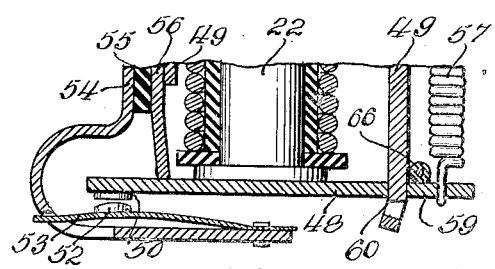

Considering Figures 6 and 7 in detail, it will be noted that a leaf-spring contact 52, 53 has been provided and is supported at one end of the contact frame 54 of relay 22. When the armature 48 is deenergized, the spring 57 pivots this armature about the point 60, moving the contact 50 into engagement with the contact 52 carried by the leaf spring 53, and also pressing the leaf spring 53 down against the laterally extending portion 105 of the contact frame 54. The leaf spring 53 is mounted for cantilever movement, and is controlled in its released position by the cut-out portion 106 of the frame 54, the leaf spring extending therethrough and being limited against upward movement upon attraction of the armature 48 by reason of its engagement with the upper defining edge of the cut-opt opening 106 through which it extends. This particular type of contact mounting insures a positive wiping contact between the contacts 50 and 52, and also insures pressure engagement therebetween when the armature 48 is in released position.

The unit thus far described, will operate on a voltage range of from 5 to a little over 8 volts, being adjusted to operate on normal voltage with normal headlamp load. If an open circuit fault condition occurring in the headlamp circuit with the switch in either number 3 or number 4 position is intermittent, it will be obvious that the control unit will intermittently flash the auxiliary lamps, in accordance with the opening and closing of the headlamp circuit at the faulted point.

It should also be understood that a short circuit or overload fault in any part of the tail, head, or instrument lamp circuits, will cause the unit to energize the auxiliary lamps, since the instrument lamps 7 and the tail lamps 8 are connected to the contact bridging member 16, which is also connected to the contact bridging member 17 when the switch element 12 is in any one of its circuit closing positions, 2, 3 or 4, whereby a short circuit or overload fault in either the instrument lamp circuit 93, 94, 95 or in the tail lamp circuit 96, 97 will establish a relatively heavy current flow through conductor 100, relay contacts 50, 52 and relay winding 44 for actuating relay armature 48 in the same manner as with a short circuit or overload fault in either of the headlamp circuits. Thus, with the present system, a faulty condition in the headlamp circuit or in the instrument lamp or tail lamp circuit will result in a similar operation of the unit, as previously described, to energize the auxiliary lamps, thus indicating to the operator that a faulty condition has occurred. If the condition is a short circuit or overload condition, and is intermittent, the auxiliary lamps will not flash, as the unit locks out the shorted part of the circuit against heavy current flow and remains in this condition until the switch is returned to the open position. Thus, flashing under an intermittent short or overload will not occur, since the locking out of the lock-out relay 22 will result in continuous energization of the parking lamps 6, regardless of any intermittent shorting or overloading of the tail light, instrument light, or headlamps circuit.

In addition, it will be noted that by the circuit thus provided, if there is a short circuit in the current supply line between the unit and the lighting control switch 5, the unit will operate the lock-out relay 22 to open the contacts 50 and 52 until such time as the short circuit is eliminated.

Considering now the embodiment of the invention shown in the circuit disclosed in Figure 2, and in the detail views of the unit shown in Figures 8 to 11, this modification is practically the same as described in connection with the embodiment shown in Figures 1, 3, 4 and 5, except that in place of energizing the parking lights 6 as the auxiliary driving lights when a fault condition occurs in the lighting circuit, a pair of separate auxiliary safety driving lights 110 are provided, which are connected by the branched conductor 112 and the conductor 113 to the terminal 28 of the control unit.

Figure 2:
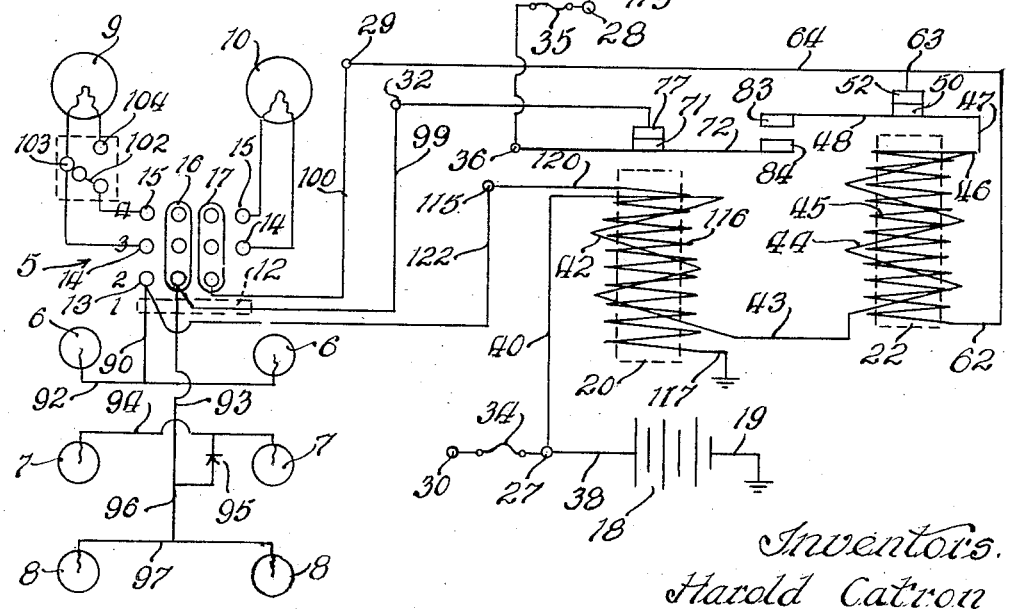
Figure 2 is a circuit diagram showing another form of the invention when independent auxiliary safety driving lamps are provided.
Figure 3:
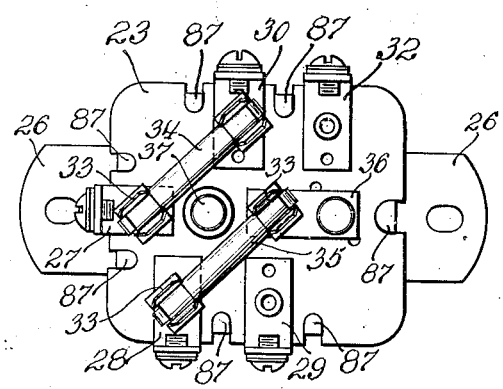
Figure 3 is a top plan view of the unit employed in the circuit shown in Figure 1.

In the operation of the circuit shown in Figure 2, an open circuit condition or a short circuit condition occurring when the switch bar 12 is in either of positions 3 or 4 results in instantaneous energization of the lamps 110, in place of energization of the lamps 6.

Figure 8:
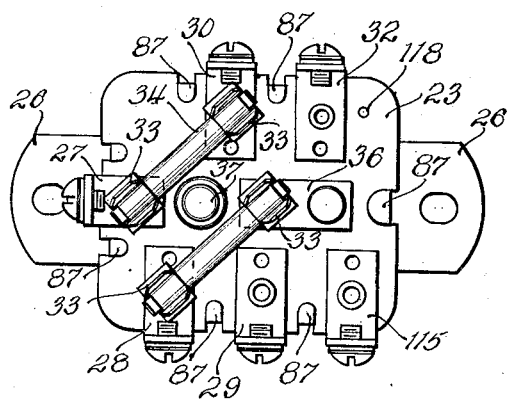
Figure 8 is a top plan view of the unit employed in the circuit shown in Figure 2.
Figure 9:
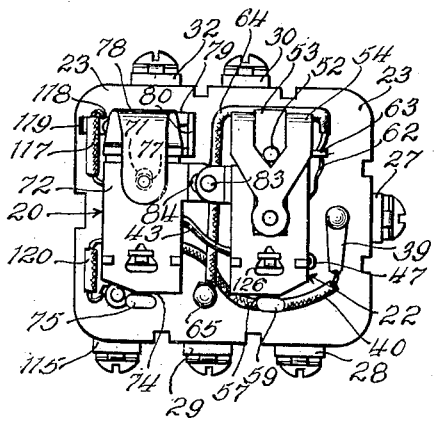
Figure 9 is a bottom plan view of the unit shown in Figure 8, with the casing removed.
Figure 10:
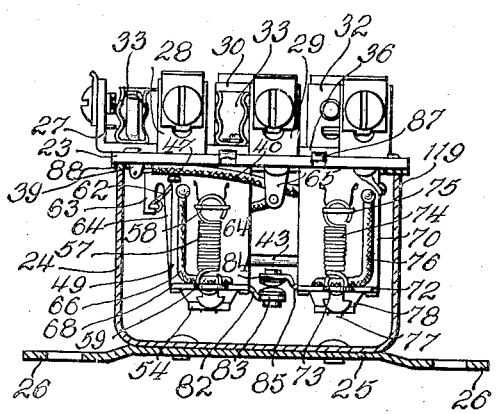
Figure 10 is a side elevational view of the unit shown in Figure 8, with the casing shown in section.

Considering the control unit in detail, this unit is substantially identical with the unit described in connection with Figures 3 to 7, but includes the provision of an additional terminal 115, which terminal is mounted on the plate 23 of the unit adjacent the terminal 29. In the circuit provided for the unit, current from the battery 18 is conducted to the unit through the conductor 38 to the terminal 27 carried by the unit, and from this terminal a branch conductor 40 carries the current to the winding 42 on the relay 20. In addition, by means of the fuse connection 34 carried by the fuse clips 33 on the terminals 27 and 30, respectively, a fused outlet terminal connection 30 is provided leading from the battery through the terminal 27 to the terminal 30, independently of the circuit current passing into the control unit. The control unit itself is varied slightly, the relay 20 in the present embodiment being provided with a shunt coil 116, having ground connection at one end through conductor 117, which, as shown in detail in Figures 8, 9 and 10, is connected with a rivet 118 carried by the plate 23 and supporting a grounding clip 119 fastened to said plate by the rivet 118, this grounding clip bearing against the metallic housing 24 for establishing a ground connection when the relay assembly is secured in said housing. The opposite end of the shunt coil 116 is provided with an outlet lead 120, which extends to and has electrical connection with the terminal 115. From the terminal 115, a conductor 122 extends this circuit to the contact 13 of the lighting switch 5, from the contact 13 the circuit being substantially the same as described in connection with Figure 1.

The remaining details of construction of the unit are substantially the same as described in connection with the embodiment disclosed in Figure 1, the relay 22 having the primary winding 44 and the shunt winding 45, having common connection at 46 and through conductor 47 being connected to the armature 48 of the relay 22, the opposite end of the shunt winding being connected through the conductor 62 to the terminal junction 63 of the shunt winding and the supporting frame 54, this junction then extending the circuit through the conductor 64 to the terminal lug 65 which is electrically connected to the stud supporting the terminal 29. From the terminal 29 the circuit is extended through conductor 100 to the terminal bridging member 17 in the manner previously described.

The relay 20 is provided with the armature 72, having electrical contact with the armature frame through the bonding conductor 76, and the frame being electrically connected to the supporting lug 36 by the riveted connection previously described. From the lug 36 the circuit is extended from the armature 72 through the fuse contact clip 33 and the fuse 35 to the terminal 28, and from the terminal 28 to the auxiliary safety driving lights 110.

The armatures 48 and 72 are provided with intermediate contacts 83 and 84, these contacts being caused to engage by a short circuit or overload fault in the circuits of either of the lights, 6, 7, 8, 9 or 10, so as to complete a circuit between the armatures 48 and 72, thereby completing a circuit from the battery 18 through the windings 42 and 44 and the armatures 48 and 72 to the terminal 28 and thence to the auxiliary safety driving lights.

Similarly, when the relay 20 is energized by a normal current flow which does not actuate the armature 48 of relay 22, the armature 72 of relay 20 is moved out of contacting engagement, breaking contact between the contacts 71 and 77, and thereby deenergizing the circuit through the terminal 28. With the switch 12 in the position shown by the numeral 1, all of the lighting circuits are deenergized, and of course no current flows through the control unit containing the relays 20 and 22. Assume now that the contact bar 12 is moved into position 2 where it effects bridging engagement across the contact 13 and the terminal bridging members 16 and 17. This supplies current from the terminal 29 of the control unit through the conductor 100 and through the bridging members 17 and 12 to the contact 13, and from this contact to the parking lights 6 through conductors 90 and 92. Also, current is supplied to the terminal bridging member 16 from the terminal bridging member 17 by the contact bar 12, to energize the instrument lights 7 and the tail lights 8. In addition, current is conducted from contact 13 through conductors 122 and 120 to the winding 116 on the relay 20 for assisting in holding the relay armature 72 attracted so that the auxiliary lights 110 will not be energized at this time. In this position of the switch, if a short circuit or excessive overload should exist or occur in the parking light, instrument light or tail light circuits, the increased current will result in attraction of the armature 48 of the relay 22, breaking the connection between contacts 50 and 52 and simultaneously making contact with the contacts 83 and 84; at the same time the circuit through conductor 99 will be interrupted by the armature 72 opening the circuit between contacts 71 and 77, whereby the auxiliary lights 110 are separated from the faulty part of the circuit and are excited directly from the armature 48 through contacts 83 and 84. The armature 48 of relay 22 will remain down until the fault is cleared. No vibration occurs with a short circuit or overload in any part of the parking, instrument or tail light circuits, when the switch bar 12 is in No. 2 position.

Now assume the switch has been moved to the position indicated by the numeral 3, which energizes the dim filament of the headlamps 9 and 10. In case of an open circuit, due to a fault condition such as burning out of the headlamp filament, the current passing through the winding 42 of the relay 20 is diminished, releasing the armature 72 and producing engagement of contacts 71 and 77, resulting in energization of the auxiliary safety driving lamps 110.

If a short circuit or overload exists with the switch in the No. 3 position, the control unit functions in the manner previously described, opening contacts 50 and 52 by energization of the relay 22 to attract armature 48, closing contacts 83 and 84 simultaneously, opening contacts 71 and 77, and conducting current to the auxiliary driving lamps 110 through the conductor 47, armatures 48 and 72, and thence through terminal 28 to the safety lamps.

Under normal conditions, with the headlamp circuit in proper operating condition, the current through the winding 42 of relay 20 is sufficient to hold open contacts 71 and 77 by attraction of armature 72, and thereby maintain the circuit through the terminal 28 to the safety lamps 110 deenergized. Upon occurrence of a fault such as an open circuit, burned out filament, a short circuit, or excessive overload, the unit functions in the manner described previously to close contacts 71 and 77 for energizing the lamps 110 from the terminal 32 by reason of the bridging connection between the members 16 and 17 in case of an open circuit condition, or by energizing both armatures 72 and 48, and conducting current from the junction 46 to conductor 47 and the armatures to the terminal 28 to energize the lamps 110, in case of a short circuit or overload condition.

With the switch 5 in the position indicated by numeral 1, all of the circuits are, of course, deenergized, and consequently no current flows through the contacts 77 and 71. When the parking circuit established by moving the switch into the position indicated by numeral 2 is energized, and operates under normal conditions, the coil 116, which is the shunt coil about the relay 20, aids in opening the contacts 71 and 77, preventing the excitation of the lamps 110. The provision of this coil 116, which is only energized when the switch element 12 is in position to illuminate the parking lights, compensates for the lower current flow to these parking lights, as compared to the headlights, and thus assures operation of relay armature 72. The lamps 6 are conventional parking lamps, and are preferably of lower candle power than the headlamps 9 and 10, and the auxiliary lamps 110 are also preferably of lower candle power than the headlamps.

A fuse connection 35 between the junction 36 and the terminal 28 is provided, in view of the fact that a short in this circuit would damage the control unit.

The details of construction of the two units are substantially the same, since the same type of armature supporting frame and contact supporting frame are provided, and the connections are substantially the same except for the two connections 117 and 120 of the auxiliary shunt coil 116 provided in the circuit shown in Figure 2.

The relay 22 is provided with the resilient leaf-spring contact member 53 carrying the contact 52 in both embodiments of the invention.

Figure 11:
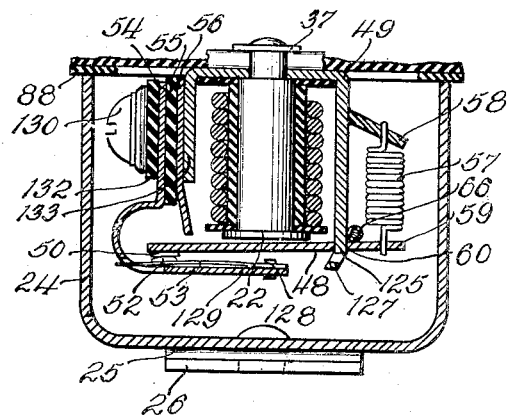
Figure 11 is an enlarged sectional view taken substantially on line 11—11 of Figure 10.

In Figure 11 we have disclosed in detail the manner in which a relay, such as the relay 22, is mounted in the control unit. The relay 22, and this is also true of the relay 20, has the core thereof supported by the riveted lug 37 mounted on the outer surface of the terminal plate 23, and has a shouldered engagement holding the armature frame 49, which is preferably U-shaped, in position thereon. The supporting frame 49 has a pair of projecting tongue portions 125 at the outer corners of the longer arm thereof, which are disposed in marginal slots in the armature for controlling the pivotal mounting of the armature 48 on the frame 49. The armature 48 is apertured, as indicated at 126 (Figure 9) and a suitable projection 127 extends from the supporting frame through this aperture for guiding the armature into position. As previously described, the armature 48 at one end is provided with the contact 50 adapted to engage the contact 52 carried by the leaf spring 53 which is secured at one end, as by means of rivets 128, to the overhanging end 129 of the contact supporting frame 54. The opposite end of the armature 48, on the opposite side of the pivotal point 60, is provided with an extending projection 59 which is engaged by the end of the spring 57, the supporting frame 49 having an integral upstruck tongue 58 for engagement with the opposite end of the spring 57. The spring 57 normally urges the armature in a counterclockwise direction about the pivot point 60 when the relay is unenergized, as shown in Figure 11, thereby engaging contacts 50 and 52.

In the case of the relay 20, the leaf spring contact is not provided, and the overhanging portion of the contact supporting frame 78 is provided with a fixed contact 77 having engagement with the contact 71 of the armature 72 when the relay is unenergized, the spring 74 normally biasing the contacts into engagement.

Referring again to Figure 11, the contact supporting frame 54 is held in fixed position by means of the screw 130, which extends through a suitable insulating washer 132 and through an enlarged opening in the frame 54, and has threaded engagement in the outwardly extending leg 133 of the frame 49. Suitable insulation 55 is disposed between the frame 54 and the stop member 56, which at its outer end is provided with the stop surface adapted to limit movement of the armature 48 toward attracted position. In this manner, the contact supporting frame 54 is supported on the armature frame 49, but is insulated therefrom. The frames 54 and 49 are provided with lateral projections adjacent the bases thereof, which projections serve as suitable lug means for securing conductors and the like thereto, as indicated at 63, 80, and 47. In each case, the relay has the supporting armature frame and the armature itself connected together by a bonding conductor such as the conductors 66 and 76, thereby providing good electrical contact therebetween, independent of the pivotal connection.

It is therefore believed that we have provided a novel type of lighting means for vehicles, whereby means is provided responsive to fault conditions in the headlamp, instrument lamp, and tail lamp circuits, for energizing auxiliary safety driving lights, this energization being entirely independent of the operator and occurring instantaneously upon the faulting of the circuit. Also, in one embodiment of the invention if the parking light circuit is faulted, an intermittent rapidly vibrating movement of the control unit will indicate to the operator that such a condition has occurred.

The provision of such a means for vehicles insures that the operator thereof will not be without lights in case of a fault in the driving light circuit during the operation of the vehicle away from a service station or the like, and also serves to provide for the provision of auxiliary driving lights which are energized independently of any control by the operator, so that the operator does not need to perform any manual operation in order to shift over from the faulted circuit to the auxiliary safety driving circuit.

We are aware that various changes and modifications may be made in the details of the control unit structures herein shown, and also in the particular lighting circuits disclosed, and appreciate that the invention is equally applicable to other than the particular types of lighting circuits which we have described in order to illustrate our invention as applied to said circuits. We therefore do not intend to limit the invention to the particular lighting circuits or the particular control units shown and described, but only insofar as defined by the scope and spirit of the appended claims.

We claim:

1. A control unit for a lighting system of a vehicle comprising a pair of relays, one relay being responsive to overload conditions and the other relay being responsive to open circuit conditions, a plurality of contacts controlled by said relays and controlling the operation of said system, an auxiliary lighting circuit, and means responsive to energization of either of said relays for opening the contacts controlling the lighting system and closing the contacts controlling the auxiliary circuit.

2. A control unit of the class described comprising a housing, a terminal plate carrier thereby, relays carried by said plate and extending into said housing, terminals on the outer side of said plate and operatively connecting said relays in series between a source of current and a lighting circuit, and means responsive to a fault condition in the circuit for selectively energizing one of said relays or deenergizing the other of said relays, said relays controlling energization of said circuit and adapted to deenergize said lighting circuit upon occurrence of said fault condition.

3. In a vehicle lighting system having two headlamp circuits and having an auxiliary lighting circuit, a light switch for selectively energizing either of said headlamp circuits, and interconnected relay means selectively responsive to an open circuit or an overload circuit condition in the energized circuit for energizing said auxiliary circuit and, in the case of an overload circuit condition, simultaneously therewith controlling the faulted circuit.

4. In a vehicle lighting system including two headlamp circuits and a parking light circuit, each of said circuits including tail lamps and instrument lamps, a light switch for selectively energizing any of said circuits, an auxiliary lighting circuit, and relay means selectively responsive to either an open circuit condition or an overload circuit condition in an energized circuit of said system for energizing said auxiliary circuit and, in the case of an overload circuit condition, simultaneously therewith controlling the faulted circuit.

5. In combination, a vehicle lighting system including a plurality of lamp circuits selectively controlled by a lighting switch, a control unit comprising an open circuit responsive member and an overload circuit responsive member connected between the lighting switch and a source of current, an auxiliary lighting circuit connected to said unit, said unit maintaining said auxiliary circuit unenergized during normal operation of any of said selected lamp circuits, and switching means controlled by said members for simultaneously deenergizing the energized lamp circuit and energizing said auxiliary circuit upon occurrence of an overload or open circuit condition in the energized lamp circuit.

6. A control unit of the class described comprising a housing, a terminal plate closing said housing, a plurality of terminals arranged on said plate, a pair of relays supported by said plate within said housing, fuse means on said plate connecting one of said relays to one of said terminals, fuse means on said plate connecting two other terminals, armatures pivotally supported adjacent said relays, and cooperating contacts carried by said armatures and closed upon energization of one of said relays for moving the armature of the other relay into attracted position.

7. A control unit of the class described comprising a pair of relay cores, an armature-supporting frame electrically connected to each of said cores, a contact carried by each frame, an armature carried by each frame and normally engaging the corresponding contact, a coil about each of said cores and connected in series, a shunt winding on one core connected to the armature of that core and to the contact on the frame supporting that armature, and contact connection between said armatures and engageable upon attraction of the shunt coil armature for opening the circuits between the frame contacts and the armatures of each core and closing the contact connection between said armatures.

8. A control unit for a lighting system of the class described having a battery connection, a plurality of terminals for connection to the lighting system, a terminal for connection to an auxiliary lighting circuit, a pair of relays, one relay being responsive to overload condition in any energized circuit of said lighting system for controlling the circuit through one of said plurality of terminals and energizing said auxiliary circuit terminal, and the other of said relays being responsive to open circuit conditions in the lighting system for energizing the auxiliary circuit terminal independently of said first relay.

9. A control unit for a lighting system of the class described comprising a pair of terminals for connection to the lighting system, a third terminal connected to the parking light circuit of said system, a pair of relays, one of said relays having an armature normally connecting said third terminal to one of said pair of terminals, the other of said relays having an armature normally connecting the other of said pair of terminals to a source of current, one of said relays being normally energized and being responsive to open-circuit condition in the lighting system for releasing its armature to establish connection between one of said pair of terminals and said third terminal for energizing the parking circuit, and the said other relay being responsive to overload conditions in said system for attracting its armature to control the circuit between said other of said pair of terminals and the source of current, and means coacting between said relays for establishing a circuit from said source of current to said third terminal governed by the energization of the said other relay.

10. A control unit for a lighting system of the class described comprising a plurality of terminals for connection to the lighting system, a battery terminal, and an auxiliary lighting circuit terminal, a pair of relays, one of said relays having an armature normally connecting said auxiliary terminal to one of said plurality of terminals and being movable out of connecting position upon energization of any of the circuits in said lighting system, the other of said relays having an armature normally connecting said battery terminal to one of said plurality of terminals, and means responsive to an open circuit condition in said lighting system for deenergizing said one relay to restore connection to said auxiliary terminal.

11. A control unit for a lighting system of the class described comprising a plurality of terminals for connection to the lighting system, a battery terminal, and an auxiliary lighting circuit terminal, a pair of relays, one of said relays having an armature normally connecting said auxiliary terminal to one of said plurality of terminals and being movable out of connecting position upon energization of any of the circuits in said lighting system, the other of said relays having an armature normally connecting said battery terminal to one of said plurality of terminals, means responsive to an open circuit condition in said lighting system for deenergizing said one relay to restore connection to said auxiliary terminal, and means responsive to an overload condition in said lighting system for energizing said other of said relays to deenergize said lighting system and to connect said armatures together for establishing a circuit from said battery terminal to said auxiliary terminal.

12. The combination, with a vehicle lighting system having a plurality of lamp circuits and a source of current, of a control unit between said source of current and said system comprising a pair of series connected relays having armatures arranged to actuate contacts adapted to engage, one of said relays being connected to be responsive to an open circuit condition in said lighting system for energizing an auxiliary lighting circuit, and the other of said relays being connected to be responsive to a short circuit condition in said lighting system for energizing said auxiliary lighting system.

13. The combination, with a vehicle lighting system having a plurality of lamp circuits and a source of current, of a control unit between said source of current and said system comprising a pair of series connected relays, one of said relays being connected to be energized during normal energization of any of said lamp circuits and to be responsive to an open circuit condition in the energized lamp circuit for energizing an auxiliary lamp circuit, and the other of said relays comprising a winding adapted to be shunted during normal energization of any of said lamp circuits, said latter relay being connected to be responsive to a short circuit condition in the energized lamp circuit for energizing the auxiliary lamp circuit, and for introducing said shunt winding into the faulted lamp circuit upon energization of the auxiliary circuit.

14. In combination, a source of current, a plurality of lamp circuits, a switch for selectively connecting said source to each of said circuits, a control unit between said source and said switch, an auxiliary lighting circuit, said control unit including a pair of series connected relays, one connected to be responsive to open circuit conditions in the lamp circuits and the other connected to be responsive to overload conditions in the lamp circuits, means controlled by said relays for energizing said auxiliary lighting circuit, and means controlled by one of said relays for introducing resistance into the energized lamp circuit.

15. In combination, a source of current, a plurality of lamp circuits, a switch for selectively connecting said source to each of said circuits, a control unit between said source and said switch, an auxiliary lighting circuit, said control unit including a pair of series connected relays, one connected to be responsive to open circuit conditions in the lamp circuits and the other connected to be responsive to overload conditions in the lamp circuits, means controlled by said relays upon the occurrence of either of said conditions for energizing said auxiliary lighting circuit, and means in said lamp circuits for indicating the operation of said overload relay.

16. In a control unit for a vehicle lighting system of the class described comprising a pair of interconnected relays, one connected to be responsive to open circuit conditions in said system and the other connected to be responsive to overload conditions in said system for energizing an auxiliary lighting circuit, a U-shaped frame for each of said relays, the armatures of each of said relays being pivotally mounted on one leg of each of said frames and overlying the core of the associated relay, and a contact carrier supported in insulated relation on said other leg of each of said frames and having a portion overlying said armature and carrying a contact, one of said carriers having a resilient support for the contact carried thereby whereby said contact remains in engagement with said armature throughout a portion of the movement of said armature.

17. In a lighting system for a vehicle including a main circuit and an auxiliary circuit, the combination of means magnetically responsive to an overload condition in said main circuit for automatically causing the energization of said auxiliary circuit, and means responsive to an open circuit or abnormally high resistance condition in said main circuit for automatically causing the energization of said auxiliary circuit.

HAROLD CATRON.
HAROLD H. CLAYTON.
RALPH L. DASHNER.